Jan. 11, 1966  K. RÄNTSCH ETAL  3,228,109
METHOD OF PRODUCING A GLASS SCALE
Filed Aug. 2, 1963

3,228,109
METHOD OF PRODUCING A GLASS SCALE
Kurt Räntsch and Albrecht Vogel, Wetzlar, Germany, assignors to M. Hensoldt & Söhne, Optische Werke AG, Wetzlar (Lahn), Germany
Filed Aug. 2, 1963, Ser. No. 299,634
Claims priority, application Germany, Aug. 4, 1962, H 46,556
7 Claims. (Cl. 33—107)

The invention relates to improvements in a method of producing a glass scale of high precision.

In high precision glass scales it is required that the intervals between the individual scale lines change as little as possible under mechanical strain of the scale body such as, for instance, bending. Particularly in glass scales whose graduation is viewed through a layer of glass, the effect has to be taken into consideration that the individual graduation lines undergo a virtual image displacement in that they appear to be raised by an amount which depends on the thickness $d$ and the index of refraction $n$ of the glass layer. The fiber characterized by this spacing from the graduation plane may in the following be called the optically neutral fiber of the scale body in contrast to its neutral fiber which is determined by the center of gravity of the scale body. This last named fiber will be referred to hereinafter as mechanically neutral fiber.

It is known to arrange the graduation lines of a glass scale on the bottom side of the scale body. In these types of glass scales the bending of the scale body, which may occur during the process of producing the graduation in the scale body as well as during the viewing of the graduation, affects the measuring result since neither the graduation plane nor the optically neutral fiber coincide with the mechanically neutral fiber. It is also known to arrange the scale lines of the glass scale outside the mechanically neutral fiber and to relocate them into this fiber by optical displacement, i.e. the optically and the mechanically neutral fibers are brought to coincide so that any bendings of the scale will have no effect on the reading. While an accurate displacement can be achieved when the scale body is given a certain profile, a possible bending of the scale body during the process of producing the graduation may, however, lead to a faulty graduation, the more so, since the graduation lies also outside the mechanically neutral fiber.

In both these types of scales the graduation lines are unprotected which means that they are subjected to soiling and damaging.

It is the object of the invention to improve the accuracy and precision of glass scales during their manufacture. In particular, according to the invention the scale lines are arranged in the mechanically neutral fiber of the scale body or very close thereto. Furthermore, the scale lines are covered by a glass plate in order to protect them from soiling and damaging, and means are provided to have the image of the graduation lines, i.e. the optically neutral fiber coincide with the mechanically neutral fiber.

In accordance with the present invention, several technically equivalent methods are proposed for solving the aforementioned problems either in an exact or in an approximate way. The approximate solution has the advantage that the manufacture of the glass scale is easier and the degree of accuracy obtained by this method is absolutely sufficient for certain purposes.

In a first exact method a scale body is used which has one outer surface arranged in or in close proximity to the mechanically neutral fiber of this scale body. By close "proximity" will be understood here and hereafter a distance so small that any changes in the graduation intervals, which may occur when the scale body is bent, are no longer noticeable as far as the technical measurement is concerned. The graduation lines are arranged on said outer surface, i.e. in the mechanically neutral fiber, so that they are insensitive against any bending of the scale body during the production of the graduation. Upon completion of the graduation the graduation lines are covered by a glass plate to protect them against damage or soil and this glass plate, if desired, may be softly cemented to the scale body. When reading the scale through the scale body, the graduation lines appear optically displaced and are transferred from the mechanically neutral fiber into the optically neutral fiber. A possible bending of the scale body would thus result in a measuring error. This measuring error, however, is prevented according to the invention in that material is taken off from the scale body to the extent where the newly produced mechanically neutral fiber comes to coincide with the optically neutral fiber or moves into its close proximity, respectively. Any reading errors which may result from the bending of the scale body will then no longer occur.

According to a further object of the invention, the cover plate for the graduation is made of such a dimension that after the mentioned removal of material it forms a common surface with the scale body. This last mentioned embodiment of the invention has the advantage that the completed glass scale has a closed rectangular shape if a U-shaped profile, for instance, was used for the scale body.

According to another exact method of the invention the scale body upon arranging thereon the graduation—again in the mechanically neutral fiber—is rigidly cemented to the cover plate. The cross section of the cover plate in this case is such that the mechanically neutral fiber, which has been displaced by the cementing, will again fall into the optically neutral fiber or in the immediate proximity thereof. The reading of the scale in this embodiment takes place through the cover plate. The scale body itself expediently has a U- or H-shaped profile.

The invention also includes several approximate methods of solving the aforementioned problems.

In a first method the graduation again is applied to an outer surface of the scale body which surface is arranged in the mechanically neutral fiber of the scale body or in its immediate proximity. For protection the graduation is covered by a glass plate through which the scale can be read. The cover plate is softly cemented to the scale body so that the mechanically neutral fiber of the scale body is retained in its position. In view of the foregoing the cover plate has to meet two requirements: firstly, it must not exceed a predetermined thickness in order to keep the optical displacement during the reading of the scale as small as possible, and secondly, it has to be highly capable of retaining its fitting. The thickness of the plate has to be so small that it narrowly meets a minimum fit requirement imposed on the plate surface. Under these conditions the virtual image displacement occurring during the scale reading is so small and the mechanically neutral and optical neutral fiber of the glass scale are so close together that any measuring errors due to the bending of the scale are negligible within the required degree of accuracy or are not noticeable at all. The scale body preferably has a U-shaped, H- or X-shaped profile.

In a further method according to the invention which leads to an approximate solution, the graduation lines are arranged on an outer surface of the scale body which does not lie exactly in the mechanically neutral fiber. The reading takes place through the scale body which reflects the image of the graduation plane according to the relation $$n-1/n \cdot d$$

which is a distance from the graduation plane proper so that the mechanically neutral fiber comes to lie between the surface carrying the scale lines and the optically neutral fiber. In the above formula, $n$ represents the index of refraction and $d$ represents the thickness of the glass layer through which the scale is viewed. The position of the mechanically neutral fiber is preferably such that this fiber is arranged about midway between the optically neutral fiber and the graduation plane. This will result in identical conditions for the reading of the scale and for the graduation process; however, during both these activities a slight error may occur if the scale body is bent. Therefore, this solution is a compromise; while the two possible errors cannot be completely eliminated, they nevertheless are appropriately balanced in their effects. The scale body may have a U-, H- or X-shaped profile and the graduation lines again are protected against soiling and damaging by a cover plate which is supplely cemented to the scale body.

Another method of manufacturing high precision glass scales in accordance with an approximate solution provides for the scale to consist of two parts, both having a U-shaped cross section. Such a scale has a particularly great resistance against bending so that bendings occur only to a very small extent. In such an embodiment of the invention one part of the scale body has a raised center portion which is received between the two leg portions of the other part. The scale lines are arranged on a surface of one of the two parts in which also lies the mechanically neutral fiber of this part. The other part serves as a cover plate. The mechanically neutral fiber of this part is present in the outside surface which abuts the surface of the other part carrying the graduation. The reading of the scale is done through the graduation carrier which may form the outer as well as the inner U-profile. During the reading the graduation lines move out of the mechanically neutral fiber which retains its position unchanged, while in the distance $$n - 1/n \cdot d$$

from the graduation plane is formed the optically neutral fiber. Reading errors caused by bending of the scale body are avoided by the particular cross section of the scale body.

When one takes a beam having parallel top and bottom surfaces and flexes the same, then the surface portions along the stronger curved face are pushed together while the surface portions on the less strongly curved face are pulled apart. Between these two beam surfaces lies, however, a mechanically neutral fiber in which the surface elements are neither stretched nor pushed together. When such a beam is provided with a measuring scale, the scale along one side when flexed will move the graduations together when the scale is flexed in one direction and the graduations will be moved apart when the scale is moved in another direction. Thus flexing of the beam for any reason causes the scale lines to be moved together and apart when the beam is flexed and this produces errors in the measurements produced by the scale. In precision scale members the scale lines are covered with a glass plate to protect them against injury. When a glass plate is applied scale lines appear when viewed as being closer to the upper surface depending upon the index of refraction of the covering glass. If the profile of the measuring body is given a particular sectional shape and the scale markings inscribed on the surface in approximately the same plane as the mechanically neutral plane or fiber of the glass no change will occur in an optical sense when the scale is viewed, since the distances between the scale lines remain unchanged. For this reason, this fiber is designated as the optically neutral fiber. In the present invention means is provided to cause the optically neutral fiber or plane and the mechanically neutral plane or fiber to lie substantially in the same common plane.

The invention will now be described with reference to the accompanying drawings, in which.

Figure 1:
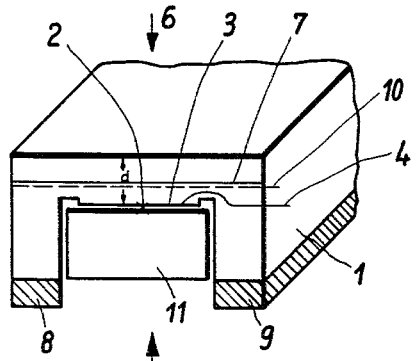
FIG. 1 illustrates a measuring scale having a closed total profile.

It is physically impossible to inscribe a scale within the interior of a glass ruler or the like in which the optical and mechanically neutral fibers are disposed in the same plane because these planes are not accessible to the cutting or engraving tools employed in inscribing measuring linear graduations. Therefore, the scales are inscribed on a surface of a glass beam and covered later.

The pressure of the engraving tool has a tendency to flex the beam and unless the graduations are engraved in a plane substantially in the same plane as the mechanical neutral plane or fiber the graduations will be of different distances apart and will result in measurement errors.

For this reason, in the present invention scale lines are arranged or inscribed by a surface cutter in a plane and on a surface which is approximately in the same plane as the mechanically neutral fiber plane.

For this purpose there are disclosed two types of cementing the measuring scale body which carries the scale with the covering glass plate:

(a) First, a rigid cementing process may be used—this means the following: Assuming one starts with the above discussed beam and arranges the scale lines in the neutral fiber of the beam and now attaches thereto a second beam which covers the scale lines so that a rigid unitary beam is produced. If this is done, then the mechanically neutral fiber is displaced owing to the formation of a new profile.

(b) If one, however, places the covering beam loosely upon the first-mentioned beam having the scale thereon, then the mechanically neutral fiber is not displaced because when the beam is bent, the covering beam has no influence upon the carrier beam at all.

Considering these possibilities, there are different solutions for the problem consisting in bringing together the mechanically neutral fiber with the optically neutral fiber.

Referring now to the drawing of this application, it should be noted first of all that the measuring scale disclosed is always viewed from the above while the illumination takes place from below.

According to FIG. 1, a soft cementing is employed, which means that the mechanically neutral fiber remains in its position. Since, however, the measuring scale is viewed through the carrier beam, the optically neutral fiber has a displaced position which is designated with 10. In order to obtain according to the above discussion a precision scale, it is necessary to provide means whereby the mechanically neutral fiber is united with the optically neutral fiber. This is accomplished in that one removes material from the legs 8 and 9 of the material provided with parallel lines, and this removal of material from the legs 8 and 9 takes place until the mechanically neutral fiber is united with the optically neutral fiber and therewith the problem is solved.

Figure 2:
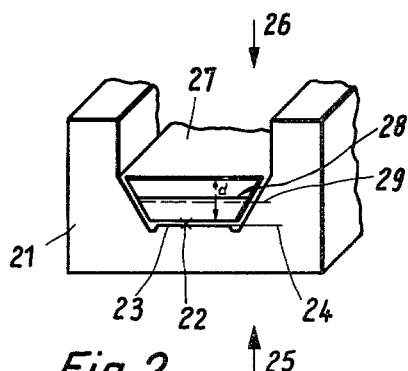
FIG. 2 illustrates another embodiment with a rigidly cemented cover plate.

FIG. 2 discloses an embodiment of the invention in which the scale lines again are arranged in the mechanically neutral fiber. Thereupon the scale lines are covered by a glass plate 27, and this results in an optically neutral fiber 28. In this FIG. 2, the glass plate 27 and the carrier 21 are rigidly cemented together so that there is formed a new common profile which has the property that a new mechanically neutral fiber is produced which now, however, coincides with the optically neutral fiber. It will be noticed that in FIG. 2 the scale is viewed through the cover plate 27.

Figure 3:
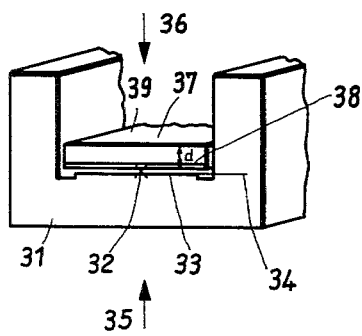
FIG. 3 illustrates still another embodiment of a measuring scale with a softly cemented cover plate.

FIG. 3 discloses an approximate solution. In this figure again the measuring scale lines are arranged in the mechanically neutral fiber of the body 31. The cover plate 39, is, however, selected in this embodiment to have such a thin dimension that the optically neutral fiber for all practical purposes remains in the immediate neighborhood of the mechanically neutral fiber.

Figure 4:
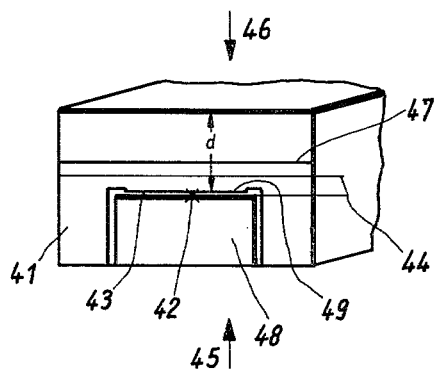
FIG. 4 illustrates a further embodiment with a closed total profile.

FIG. 4 discloses another approximate solution of the problem. In this embodiment the scale lines are not strictly arranged in the mechanically neutral fiber but in a plane which lies closely adjacent therto. The scale lines are again viewed through the carrying body and this causes an optical displacement. The mechanically neutral fiber lies in FIG. 4 between the optically neutral fiber 47 and the plane 43 in which these scale lines are arranged. A similar embodiment of the invention is disclosed in FIG. 5 in which the features of the FIGS. 3 and 4 are combined.

Referring to FIG. 1, the scale body 1 has a U-shaped profile. The graduation lines 2 are arranged on an outer surface 3 which first forms the mechanically neutral fiber 4 of the scale body 1. The arrow 5 designates the direction of illumination and the arrow 6 illustrates the viewing direction. During the reading the graduation lines 2 which are viewed through the glass layer having a thickness $d$, appear as being raised by a distance which is equal to $n-1/n \cdot d$ and form the optically neutral fiber 7. In order that the mechanically neutral fiber coincides with the optically neutral fiber, the hatched portions 8 and 9 will be removed from the legs of the scale body 1 so that this desired condition is reached. The newly created mechanically neutral fiber is represented by the dash line 10. For protecting the graduation 2, there is provided a cover plate 11 having such a dimension that upon removal of the portions 8 and 9 it forms a closed profile together with the scale body 1.

FIG. 2 illustrates a scale body 21, the graduation lines 22 of which are arranged on a surface 23 which is positioned in the mechanically neutral fiber 24 of the scale body 21. The arrows 25 and 26 again indicate the direction of illumination and observation, respectively. The reading takes place through the cover plate 27, whose thickness $d$ and index of refraction $n$ determine the position of the optically neutral fiber 28. The cover plate 27 is rigidly cemented to the scale body 21 so that the mechanically neutral fiber of the latter is displaced toward the optically neutral fiber. If the cross section of the cover plate 27 is properly selected, the two neutral fibers will coincide, that is, the newly created mechanically neutral fiber 29 shown in dash lines moves into the optically neutral fiber 28 or into its immediate proximity.

In FIG. 3 is illustrated a scale body 31 having a U-shaped cross section. The outer surface 33 of the scale body 31 indicates the position of the mechanically neutral fiber 34 of the same. The graduation 32 is applied to the surface 33, thus being arranged in the mechanically neutral fiber or in close proximity thereof. Illumination and observation of the graduation take place in the direction of the arrows 35 and 36, respectively. The graduation is covered by a glass plate 37 through which the graduation lines are read off. The glass plate 37 is softly cemented to the scale body 31 so that the position of the mechanically neutral fiber 34 of the scale body 31 will not be changed. Owing to the optical displacement the graduation lines 32 appear as being raised a distance which is equal to $n-1/n \cdot d$ and form the optically neutral fiber 38. The thickness $d$ of the cover plate 37 is kept as small as the requirement of retaining fit of the surface 39 will permit so as to limit as much as possible the optical displacement and therewith the distance between the mechanically neutral fiber 34 and the optically neutral fiber 38.

FIG. 4 illustrates a scale body 41, the outer surface 43 of which is provided with the graduation lines 42 which are positioned somewhat outside of the mechanically neutral fiber 44 of the scale body 41. The arrows 45 and 46 again indicate the direction of illumination and viewing, respectively. When reading the scale, which takes place through a portion of the scale body having a thickness $d$, the image of the graduation lines 42 appears in the optically neutral fiber 47. The profile of the scale body 41 is such that its mechanically neutral fiber 44 comes to lie between the graduation plane 49 and the optically neutral fiber 47. For the protection of the graduation lines 42 a cover plate 48 is arranged between the side pieces of the scale body and this glass plate 48 is softly cemented to the scale body 41.

Figure 5:
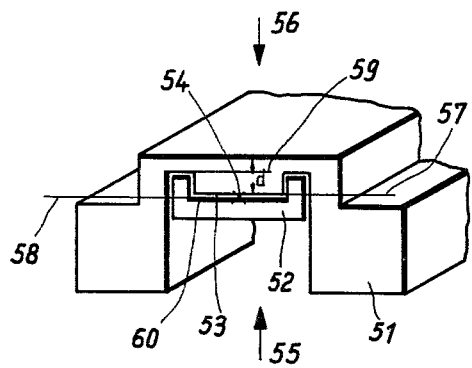
FIG. 5 illustrates a measuring scale composed of two assembled U-profiles.

FIG. 5 illustrates a scale body which is composed of two U-shaped profiles 51 and 52. The profile 51 is provided between its two leg portions with a raised area 53 on which the graduation 54 is arranged. This area 53 simultaneously contains the mechanically neutral fiber 57 of the profile 51. The mechanically neutral fiber 58 of the profile 52 is positioned in the plane 60 which abuts the area 53 carrying the graduation of the profile 51. This area 53 is embraced by the two leg portions of the U-shaped profile 52. The illumination of the graduation takes place by the profile 52 in the direction of the arrow 55. Thus, the profile 52 assumes the part of a cover plate. The center portion of the profile 51, through which the viewing takes place in the direction of the arrow 56, is determinative for the formation of the optically neutral fiber 59 in which will appear the image of the graduation 54. In this embodiment of the invention the directions of illumination and observation may be exchanged in which case the optically neutral fiber 59 would move into the profile 52.

What we claim is:

1. A method of producing a high precision glass scale, consisting of the steps of forming a scale body of channel section having opposed walls connected by a web portion the inner surface of which lies substantially in the same plane as the mechanically neutral fiber of said scale body, producing graduations on said inner surface, covering said graduations with a glass plate, and finally shifting said graduations into a plane so that said graduations appear in a plane lying substantially within the optically neutral fiber of said glass body.

2. In a method of producing a high precision glass scale, consisting of the steps of forming a scale body of channel section having opposed walls connected by a web portion the inner surface of which lies substantially in the same plane as the mechanically neutral fiber of said scale body, producing graduations on said inner surface, covering said graduations with a glass plate, and finally removing predetermined amounts of material from said glass body to shift the mechanically neutral fiber in a direction so that its plane is approximately coincident with the plane of the optically neutral fiber of said glass body.

3. In a method of producing a high precision glass scale, consisting of the steps of forming a scale body of channel section having opposed walls connected by a web portion the inner surface of which lies substantially in the same plane as the mechanically neutral fiber of said scale body, producing graduations on said inner surface, covering said graduations with a glass plate, and finally removing a predetermined amount of material from the outer edges of said channel walls so that the plane of said mechanically neutral fiber carrying said graduations is shifted to a plane coincident with the plane of the optically neutral fiber of said glass body.

4. In a method of producing a high precision glass scale, consisting of the steps of forming a scale body of channel section having opposed walls connected by a web portion the inner surface of which lies substantially in the same plane as the mechanically neutral fiber of said scale body, producing graduations on said inner surface, covering said graduations with a glass plate, and finally removing a predetermined amount of material from the outer edges of said channel walls so that said edges are in the same plane with said glass plate and the neutral fiber carrying said graduations is shifted to a plane substantially coincident with the optically neutral fiber plane of said glass body.

5. In a method of producing a high precision glass scale, consisting of the steps of forming a scale body of channel section having opposed walls connected by a web portion the inner surface of which lies substantially in the same plane as the mechanically neutral fiber of said scale body, producing graduations on said inner surface, covering said graduations with a glass plate, cementing said glass plate in place on said glass body, the cross-sectional dimension of said glass plate being selected such that said mechanically neutral fiber is shifted into a plane substantially coincident with the plane of the optically neutral fiber of said glass body.

6. In a method of producing a glass scale as set forth in claim 5 in which said glass plate is softly cemented to said glass body.

7. In a method of producing a high precision glass scale, consisting of the steps of forming a scale body of composite channel sections interfitted with inner web portion surfaces in mutually engaging relation with said surfaces lying in a plane substantially coincident with the plane of the mechanically neutral fiber of said composite scale body, producing graduations on one of said mutually engaging surfaces, assembling said channel sections into interfitting relation so that the plane of the graduations will appear in proximity to the optically neutral fiber of one of said interfitted channel sections.

References Cited by the Examiner
UNITED STATES PATENTS 2,238,190    4/1941    Sawtelle _____ 33—98

FOREIGN PATENTS 1,054,722    4/1959    Germany.
1,136,497    9/1962    Germany.
309,608    11/1956    Switzerland.

ISAAC LISANN, *Primary Examiner*.